US011221983B1

(12) United States Patent
Chakravarthy et al.

(10) Patent No.: US 11,221,983 B1
(45) Date of Patent: Jan. 11, 2022

(54) MULTI-LEVEL INDEXING OF BACKUP FILES

(71) Applicant: EMC IP Holding Company LLC, Hopkinton, MA (US)

(72) Inventors: Arun Chakravarthy, Bangalore (IN); Ning Hu, Mississauga (CA)

(73) Assignee: EMC IP Holding Company LLC, Hopkinton, MA (US)

(*) Notice: Subject to any disclaimer, the term of this patent is extended or adjusted under 35 U.S.C. 154(b) by 456 days.

(21) Appl. No.: 16/116,375

(22) Filed: Aug. 29, 2018

(51) Int. Cl.
*G06F 16/00* (2019.01)
*G06F 16/11* (2019.01)
*G06F 11/14* (2006.01)
*G06F 16/13* (2019.01)
*G06F 16/901* (2019.01)

(52) U.S. Cl.
CPC .......... *G06F 16/11* (2019.01); *G06F 11/1448* (2013.01); *G06F 16/13* (2019.01); *G06F 16/9027* (2019.01)

(58) Field of Classification Search
CPC ...... G06F 16/11; G06F 16/9027; G06F 16/13; G06F 11/1448; G06F 17/30067; G06F 16/27; G11B 27/105; G11B 27/034; G11B 27/329; G11B 27/34
See application file for complete search history.

(56) References Cited

U.S. PATENT DOCUMENTS

| | | | |
|---|---|---|---|
| 9,753,813 B1* | 9/2017 | Fan | G06F 11/1446 |
| 2012/0179655 A1* | 7/2012 | Beatty | G06F 16/128 |
| | | | 707/646 |
| 2015/0378834 A1* | 12/2015 | Bachu | G06F 11/1451 |
| | | | 707/646 |
| 2019/0065322 A1* | 2/2019 | Chakankar | G06F 3/0689 |

* cited by examiner

*Primary Examiner* — Ashish Thomas
*Assistant Examiner* — Suman Rajaputra
(74) *Attorney, Agent, or Firm* — Dergosits & Noah LLP; Todd A. Noah (57) ABSTRACT

A system indexes a first backup file, created for a data object when a first time period expired, in a first level of a data structure. The system indexes a second backup file, created for the data object when a second time period expired, in a second level of the data structure, the second time period being shorter than the first time period. The system receives a request to restore the data object to a specified time. The system enables restoration of the data object by identifying a first indexed backup file associated with the specified time in the first level of the data structure, by identifying a part of the second level of the data structure corresponding to the first indexed backup file, and by identifying a second indexed backup file associated with the specified time in the part of the second level of the data structure.

20 Claims, 4 Drawing Sheets

MULTI-LEVEL INDEXING OF BACKUP FILES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup files for that state to the data object.

A backup/restore application can create a full backup file for a data object by backing up all of the data in the data object. Typically, a full backup file is created at infrequent intervals, and serves as the reference point for subsequent differential backup files, incremental backup files, and/or transaction log backup files.

A backup/restore application can create a differential backup file for a data object by backing up the data that has changed in the data object since the last full backup file was created for the data object. As the elapsed time increases since the most recent full backup file, the accumulated changes increase in a data object, as does the time to create a differential backup file. Restoring a data object, which was backed up by a differential backup file, to a specified time can require starting from the most recent full backup file prior to the specified time, and then applying only the most recent differential backup file prior to the specified time.

A backup/restore application can create an incremental backup file for a data object by only backing up data that is new or changed in the data object since the most recent previous backup file was created, which may have been a full backup file, a differential backup file, or another incremental backup file. Since an incremental backup file does not store duplicate copies of unchanged data, more backup files created at more points in time may be efficiently stored by organizing the data into increments of change between points in time. Using an incremental backup file to restore a data object to a specified time can require starting from the most recent full backup file prior to the specified time, and then applying in turn each of the incremental backup files created since the most recent full backup file prior to the specified time, through the most recent incremental backup file created prior to the specified time. Such a restoration may include starting from the most recent full backup file prior to the specified time, applying the most recent differential backup file that was created prior to the specified time, and then applying in turn each of the incremental backup files created since the most recent differential backup file created prior to the specified time, through the most recent incremental backup file created prior to the specified time.

A backup/restore application creates a transaction log backup file for a data object by only backing up a history of actions executed by the data object's management system. The data object's management system can use a transaction log backup file to re-apply the changes made by committed transitions that are not materialized in the data object and roll back the changes to the data object that were made by uncommitted transactions. Using a transaction log backup file to restore a data object to a specified time can require starting from the most recent full backup file prior to the specified time, and then applying the most recent differential backup file and/or most recent incremental backup file(s) that were created prior to the specified time. Then the restoration can require applying in turn each of the transaction log backup files created since the most recent differential backup file and/or most recent incremental backup file(s) created prior to the specified time, through the most recent transaction backup file created prior to the specified time. Alternatively, using a transaction log backup file to restore a data object to a specified time can require starting from the most recent full backup file prior to the specified time, and then applying in turn each of the transaction log backup files created since the most recent full backup file created prior to the specified time, through the most recent transaction backup file created prior to the specified time.

A data object may be a collection or a group of information that is backed up as a unit, such as the information for a computer or a network of computers. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

When a system administrator wants to restore a data object to a specific time, the system administrator may have to manually select which backup files to restore, and then restore the selected backup files one after the other. Some backup/restore applications automate this restoration process by searching an index of the backup files and selecting the set of backup files required to restore a data object to a specified time. However, the process of searching the index of the backup files may be inefficient relative to the selection of only a few backup files required for a restoration.

For a simplified example, a backup/restore application creates a full backup file of a database at the midnights of the first 4 Sundays in July 2018 (July $1^{st}$, $8^{th}$, $15^{th}$, and $22^{nd}$), and creates a differential backup file of the database on the remaining midnights in July 2018. On Saturday Jul. 28, 2018, a database system administrator requests the restoration of the database to its state on Thursday Jul. 19, 2018, so the backup/restore application searches the index for the first 19 of the 28 backup files to identify the 2 backup files required for the restoration, which are the full backup file created on Sunday July $15^{th}$ and the differential backup file created on Thursday July 19$^{th}$. For this simplified example, 10.5% (2 of 19) of the searches in the index of the backup files resulted in identifying a backup file for the restoration.

In a less simplified example, the same backup/restore application also creates incremental backup files of the database every hour other than midnight, and also creates transaction log backup files every 15 minutes between each hour, such that the index of all backup files includes a total of 2,688 backup files for the first 28 days of July 2018. When the database administrator requests a restoration of the database to its state on Thursday Jul. 19, 2018, at 9:15 A.M., the backup/restore application searches the index for the first 1,861 of the 2,688 backup files to identify only 12 backup files required for the restoration, which are the full backup file created on Sunday July 15$^{th}$, the differential backup file created on Thursday July 19$^{th}$, the 9 incremental backup files created from 1:00 A.M to 9:00 A.M. on July 19$^{th}$, and the transaction log backup file created at 9:15 A. M. on July 19$^{th}$. For this less simplified example, 0.6% (12 of 1,861) of the searches in the index of backup files resulted in identifying a backup file for the restoration. If backup files are created every minute and backup files are stored for a year, a backup restore application may search an index of more than half a million backup files to identify relatively few backup files required for a restoration, resulting in an even greater inefficiency in index searching.

Embodiments herein enable multi-level indexing of backup files. A system indexes a first backup file, which was created for a data object when a first time period expired, in a first level of a data structure. The system indexes a second backup file, which was created for the data object when a second time period expired, in a second level of the data structure, the second time period being shorter than the first time period. The system receives a request to restore the data object to a specified time. The system enables restoration of the data object by identifying a first indexed backup file associated with the specified time in the first level of the data structure, by identifying a part of the second level of the data structure corresponding to the first indexed backup file, and by identifying a second indexed backup file associated with the specified time in the part of the second level of the data structure.

For example, a backup/restore application indexes a database's full backup files, created on the first 4 Sunday midnights in July 2018, in the first level of a B-tree, and indexes the database's differential backup files, created on the remaining midnights in July 2018, in the second level of the B-tree. The database administrator requests to restore the database to its state on Thursday Jul. 19, 2018. The backup/restore application searches the first level of the B-tree that indexes the 4 full backup files to identify the 3$^{rd}$ full backup file, created on Sunday July 15$^{th}$, which has child nodes in the second level of the B-tree, that are the 6 differential backup files created on Monday July 16$^{th}$ to Saturday July 21$^{st}$. Then the backup/restore application searches these child nodes in the second level of the B-tree that indexes the 6 differential backup files created on Monday July 16$^{th}$ to Saturday July 21$^{th}$ to identify the 4$^{th}$ differential backup file, created on Thursday July 19$^{th}$, and uses the efficiently-identified backup files to restore the database to its state on July 19$^{th}$, as requested by the database administrator.

In contrast to the previous example that described a search of the index for the first 19 backup files indexed in a single level index to identify the 2 required backup files, the backup/restore application searched for 3 full backup files indexed in the B-tree's first level and searched for 4 differential backup files indexed in the B-tree's second level to identify the 2 required backup files. Whereas the simplified example for the single level index identified only 10.5% (2 of 19) of the searched index of backup files for the restoration, the simplified example for the multi-level index identified 28.6% (2 of 7) of the searched indexes of backup files for the restoration. While these simplified examples that describe the reduction of the index searches from 19 to 7 may seem relatively insignificant, when the number of indexed backup files increases, the reduction of index searches may be even more significant, as described below.

Figure 1:
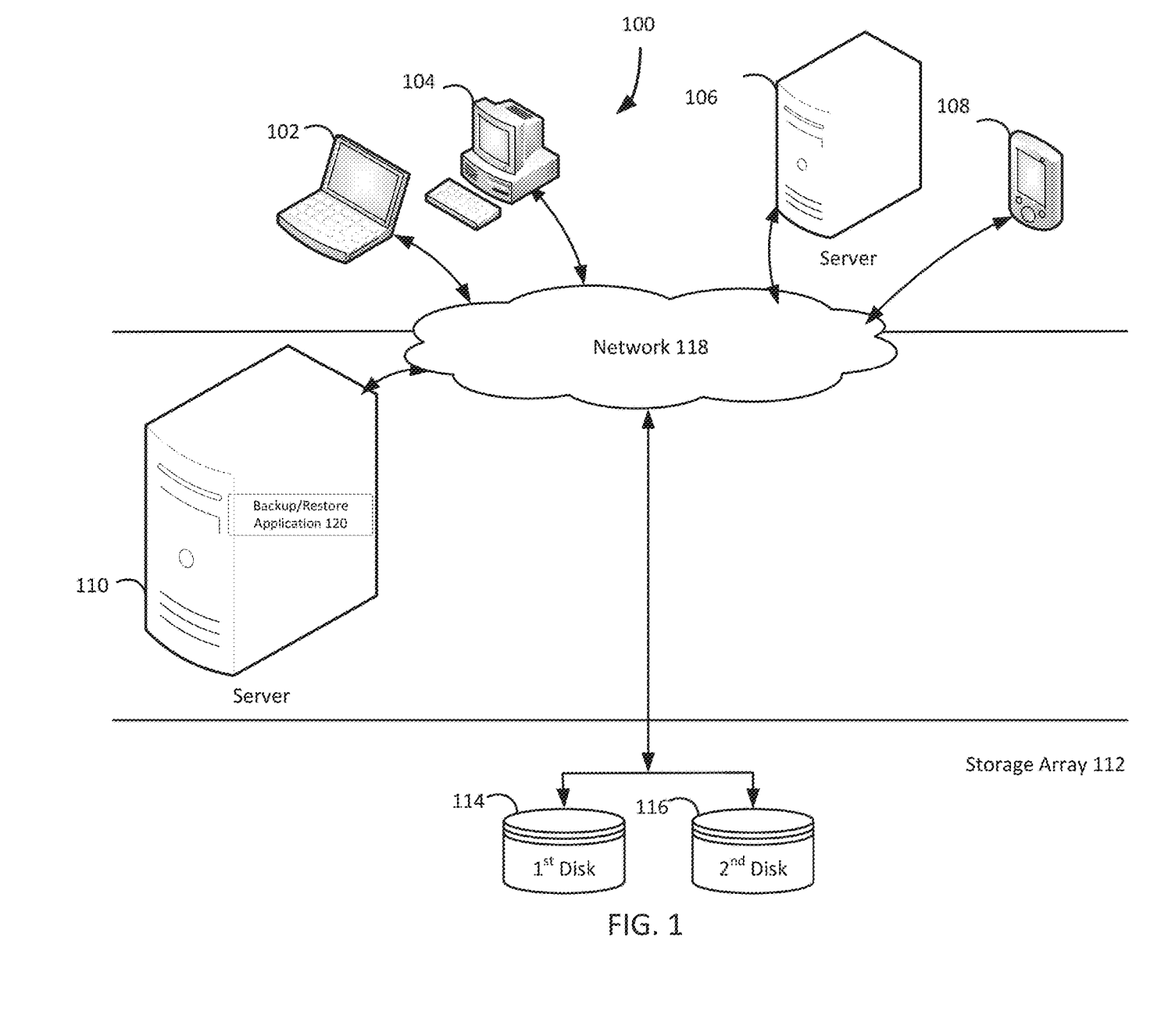
FIG. 1 illustrates a block diagram of an example system for multi-level indexing of backup files, under an embodiment.

FIG. 1 illustrates a diagram of a system 100 for multi-level indexing of backup files, under an embodiment. As shown in FIG. 1, the system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a server 110, and a storage array 112 that may be provided by a hosting company. Although FIG. 1 depicts the first client 102 as a laptop computer 102, the second client 104 as a personal computer 104, the third client 106 as a server 106, and the fourth client 108 as a personal digital assistant 108, each of the clients 102-108 may be any type of computer. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 400 depicted in FIG. 4 and described below.

The server 110, which may be referred to as a backup server 110, includes a backup/restore application 120 that can create backup files of data objects for the clients 102-108, and execute a restore based on the backup files stored on the storage array 112. The backup/restore application 120 can provide centralized administration, such as scheduling, monitoring, and managing backup operations and backup files. The backup/restore application 120 can enable the storing of backup operation schedules, client policies, and client configurations. The backup/restore application 120 can provide a unique interface to the clients 102-108 during login, and also assist the backup server 110 in authenticating and registering the clients 102-108. The backup/restore application 120 can send backup/restore work orders to the clients 102-108, which can receive and process the work orders to start a backup or restore operation. The backup/restore application 120 can maintain a local database of all processes that execute on the backup server 110. The backup/restore application 120 can execute server-side processes for a system administrator's graphical management console, which may enable the system administrator to use command line interface tools for queries. For example, a system administrator identifies the clients 102-108 registered with the backup server 110.

Although FIG. 1 depicts the backup/restore application 120 residing completely on the backup server 110, the backup/restore application 120 may reside in any combination of partially on the backup server 110 and partially on the clients 102-108, such as by residing as data management applications on the clients 102-108. Even though the following paragraphs describe EMC Corporation's Power Protect® backup/restore application, EMC Corporation's NetWorker® backup/restore application, and EMC Corporation's Avamar® backup/restore application as examples of the backup/restore application 120, the backup/restore application 120 may be any other type of backup/restore application which provides the backup/restore functionalities described in the Background section. Even though the following paragraphs describe EMC Corporation's Data Domain as an example of the backup server 110, the backup server 110 may be any other type of backup server which provides the backup/restore functionalities described in the Background section.

The backup/restore application 120 may be an EMC Corporation's Power Protect® backup/restore application, which supports Microsoft SQL/Exchange/DB2/Oracle/SAP Oracle/SAP HANA/Filesystem/Hadoop and ProtectPoint solutions. The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The backup server 110 may be an EMC Corporation's Data Domain server. The Data Domain operating system delivers scalable, high-speed, and cloud-enabled protection storage for backup, archive, and disaster recovery. Data Domain employs variable-length deduplication to minimize disk requirements and to ensure data lands on a disk that is already deduplicated, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead. Inline write and read verification protects against and automatically recovers from data integrity issues during data ingest and retrieval. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares it to what was sent to disk, proving that it is reachable through the file system to disk and that the data is not corrupted.

Figure 2:
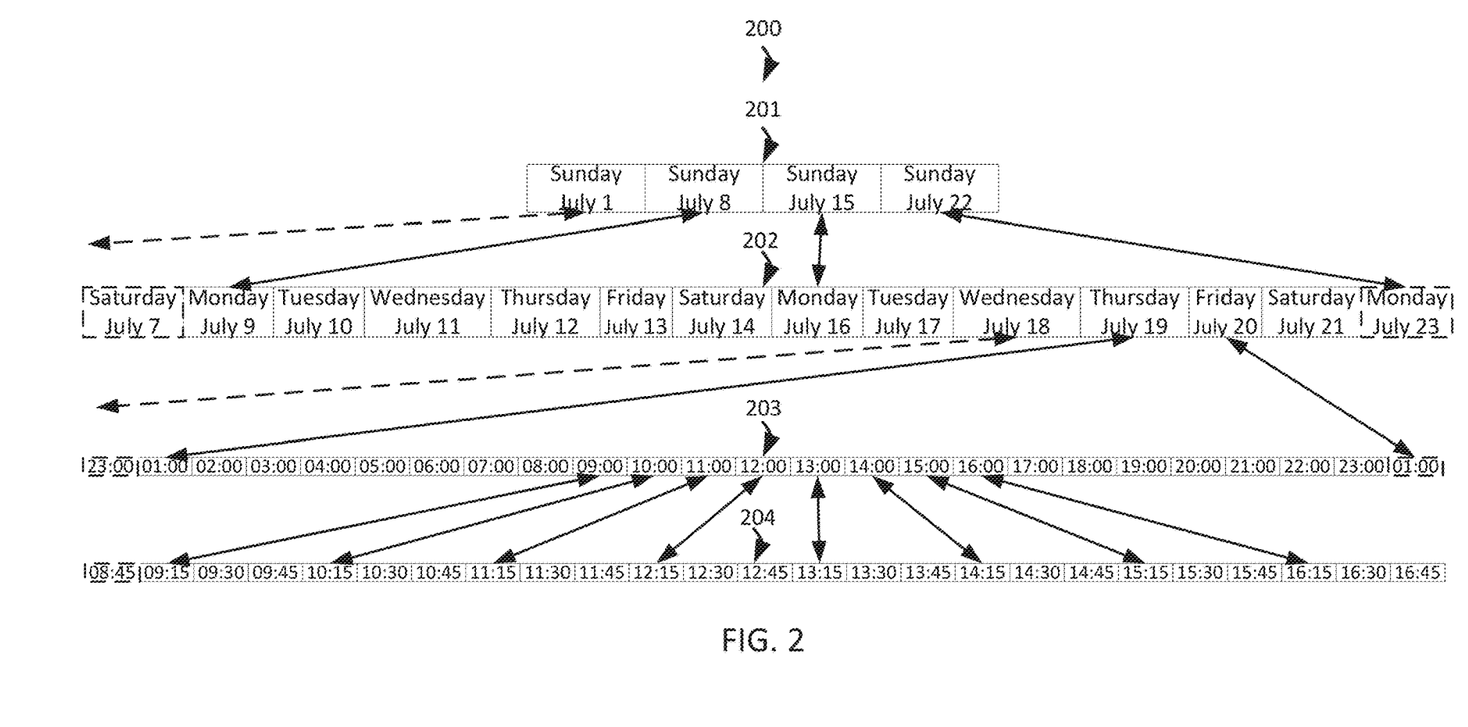
FIG. 2 illustrates a block diagram of an example multi-level index of backup files, under an embodiment.

The following examples describe multi-level indexing of backup files created for data objects after various time periods, and are based on a data structure depicted in FIG. 2 as a B-tree 200, which includes a first level 201 that indexes full backup files, a second level 202 that indexes differential backup files, a third level 203 that indexes incremental backup files, and a fourth level 204 that indexes transaction log backup files. Indexing can be the organization of data according to a specific schema or plan. A backup file for a data object can be a record of at least some of the information needed to restore the data object to a state at a specific time when the information was recorded. A data object can be a collection or a group of information that is backed up as a unit, such as the information for a computer or a network of computers. A time period can be a space of any moment, such as seconds, minutes, hours, days, weeks, months or years, with an established beginning date and ending date. A data structure can be an information organization and storage format that enables efficient access and modification. A B-tree can be a data structure that keeps data sorted and allows searches, sequential access, insertions, and deletions; and is described further below in reference to FIG. 2. A level can be a position in a hierarchy. A full backup file for a data object can be a record of all the information needed to restore the data object to a state at a specific time when the information was recorded. A differential backup file for a data object can be a record of the data that is new or changed in the data object since a backup/restore application created the most recent previous full backup file. An incremental backup file for a data object can be a record of the data that is new or changed in the data object since a backup/restore application created the most recent previous backup file. A transaction log backup file for a data object can be a record of actions executed by the management system for the data object. Although examples describe the creation of backup files that occurs on a weekly, daily, hourly, and every 15 minutes basis, the basis for the creation of backup files can be based on any time period, such as seconds, minutes, hours, days, weeks, months, or years.

The system indexes a first backup file, which was created for a data object when a first time period expired, in a first level of a data structure, and indexes a second backup file, which was created for the data object when a second time period expired, in a second level of the data structure, the second time period being shorter than the first time period. For example, the backup/restore application 120 indexes a database's full backup files, created on the first 4 Sunday midnights in July 2018, in the first level 201 of the B-tree 200, and then indexes the database's differential backup files, created on the remaining midnights in July 2018, in the second level 202 of the B-tree 200. The system can index a third backup file, which was created for the data object when a third time period expired, in a third level of the data structure, the third time period being shorter than the second time period. For example, the backup/restore application 120 indexes the database's incremental backup files, created every hour other than midnight, in the third level 203 of the B-tree 200. The system can also index a fourth backup file, which was created for the data object when a fourth time period expired, in a fourth level of the data structure, the fourth time period being shorter than the third time period. For example, the backup/restore application 120 indexes the database's transaction log backup files, created every 15 minutes between each hour, in the fourth level 204 of the B-tree 200.

The system receives a request to restore the data object to a specified time. For example, the backup/restore application 120 receives a request from a database administrator to restore the database to its state on Thursday Jul. 19, 2018. In another example, the backup/restore application 120 receives a request from the database administrator to restore the database to its state on Thursday Jul. 19, 2018 at 9:15 A.M. A request can be an instruction to a computer to provide information. A specified time can be a particular moment.

The system enables restoration of the data object by identifying a first indexed backup file associated with the specified time in the first level of the data structure, by identifying a part of the second level of the data structure corresponding to the first indexed backup file, and by identifying a second indexed backup file associated with the specified time in the part of the second level of the data structure. For example, the backup/restore application 120 searches the first level 201 of the B-tree 200 that indexes the 4 full backup files to identify the $3^{rd}$ full backup file, created on Sunday July $15^{th}$, which has child nodes in the second level of the B-tree, that are the 6 differential backup files created on Monday July $16^{th}$ to Saturday July $21^{st}$. Then the backup/restore application 120 searches these child nodes in the second level 202 of the B-tree 200 that indexes the 6 differential backup files created on Monday July $16^{th}$ to Saturday July $21^{st}$ to identify the $4^{th}$ differential backup file, created on Thursday July $19^{th}$. In another example, since the $4^{th}$ differential backup file, created on Thursday July $19^{th}$, has child nodes in the third level 203 of the B-tree 200, which are the 23 incremental backup files created from 01:00 to 23:00 on July $19^{th}$, the backup/restore application 120 searches these child nodes in the third level 203 of the B-tree 200 to identify the $9^{th}$ of these 23 incremental backup files, which was created at 09:00 on Thursday July $19^{th}$.

In yet another example, since the $9^{th}$ incremental backup file, created at 09:00 on July $19^{th}$, has child nodes in the fourth level 204 of the B-tree 200, which are the 3 transaction log backup files created from 09:15 to 09:45 on July $19^{th}$, the backup/restore application 120 searches these child nodes in the fourth level 204 of the B-tree 200 to identify the $1^{st}$ of these 3 transaction log backup files, which was created at 09:15 on Thursday July $19^{th}$. The backup/restore application 120 uses the efficiently-identified backup files to restore the database to its state on July $19^{th}$, as requested by the database administrator.

A restoration can be the action of returning something to a former condition. An indexed backup file for a data object can be a record of at least some of the information needed to restore the data object to a state at a specific time when the information was recorded, the record being organized according to a specific schema or plan. A part can be a piece of something such as an object, which combined with other pieces makes up the whole object.

Although the preceding examples described a B-tree 201 indexing full backup files on the first level 201 and differential backup files on the second level 202, and a B-tree 201 indexing full backup files on the first level 201, differential backup files on the second level 202, incremental backup files on the third level 203, and transaction log backup files on the fourth level 204, a B-tree may include different numbers of levels and may index multiple types of backup files on the same level.

For example, the backup/restore application 120 indexes a SQL database's full backup files, created on the first 4 Sunday midnights in July 2018, in the first level of a three-level B-tree, indexes the SQL database's differential backup files, created on the remaining midnights in July 2018, in the second level of the three-level B-tree, and then indexes the SQL database's transaction log backup files, created every 15 minutes, in the third level of the three-level B-tree. The backup/restore application 120 restores the SQL database to its state on July $19^{th}$ at 9:15 by first searching the first level of the three-level B-tree that indexes the 4 full backup files to identify the $3^{rd}$ full backup file, created on Sunday July $15^{th}$, which has child nodes in the second level of the three-level B-tree, which are the 6 differential backup files created on Monday July $16^{th}$ to Saturday July $21^{st}$. Then the backup/restore application 120 searches these child nodes in the second level of the three-level B-tree that indexes the 6 differential backup files created on Monday July $16^{th}$ to Saturday July $21^{st}$ to identify the $4^{th}$ differential backup file, created on Thursday July $19^{th}$. Since the $4^{th}$ differential backup file, created on Thursday July $19^{th}$, has child nodes in the third level of the three-level B-tree, which are the 95 transaction log backup files created from 00:15 to 23:45 on July $19^{th}$, the backup/restore application 120 searches these child nodes in the third level of the three-level B-tree to identify the $37^{th}$ of these 95 incremental backup files, which was created at 09:15 on Thursday July $19^{th}$. Then the backup/restore application 120 uses the efficiently-identified backup files to restore the database to its state on July $19^{th}$ at 9:15, as requested by the database administrator.

In another example, the backup/restore application 120 indexes a SQL database's full backup files, created on the first 4 Sunday midnights in July 2018, in the first level of a B-tree that has a hybrid second level which indexes different types of backup file, indexes the SQL database's differential backup files, created on the remaining midnights in July 2018, in the hybrid second level that indexes different types of backup file, and then indexes the SQL database's transaction log backup files, created every 15 minutes, in the hybrid second level that indexes different types of backup file.

The backup/restore application 120 restores the SQL database to its state on July 19$^{th}$ at 9:15 by first searching the first level of the hybrid-level B-tree, which indexes the 4 full backup files to identify the 3$^{rd}$ full backup file, created on Sunday July 15$^{th}$, which has child nodes in the hybrid second level that indexes different types of backup files. These child node in the hybrid second level include the differential backup file created on Monday July 16$^{th}$, the 95 transaction log backup files created from 00:15 to 23:45 on Monday July 16$^{th}$, the differential backup file created on Tuesday July 17$^{th}$, the 95 transaction log backup files created from 00:15 to 23:45 on Tuesday July 17$^{th}$, the differential backup file created on Wednesday July 18$^{th}$, and the 95 transaction log backup files created from 00:15 to 23:45 on Wednesday July 18$^{th}$.

These child node in the hybrid second level also include the differential backup file created on Thursday July 19$^{th}$, the 95 transaction log backup files created from 00:15 to 23:45 on Thursday July 19$^{th}$, the differential backup file created on Friday July 20$^{th}$, the 95 transaction log backup files created from 00:15 to 23:45 on Friday July 20$^{th}$, the differential backup file created on Saturday July 21$^{st}$, and the 95 transaction log backup files created from 00:15 to 23:45 on Saturday July 21$^{st}$. Then the backup/restore application 120 searches these child nodes in the hybrid second level that indexes different types of backup files, which indexes the 6 differential backup files created on Monday July 16$^{th}$ to Saturday July 21$^{st}$ and the 570 transaction log backup files created from 00:15 to 23:45 on Monday July 16$^{th}$ to Saturday July 21$^{st}$ to identify the 4$^{th}$ differential backup file, created on Thursday July 19$^{th}$ and the 37$^{th}$ of the 95 incremental backup files created on Thursday July 19$^{th}$, which was created at 09:15 on Thursday July 19$^{th}$. Then the backup/restore application 120 uses the efficiently-identified backup files to restore the database to its state on July 19$^{th}$ at 9:15, as requested by the database administrator.

FIG. 2 illustrates a block diagram of an example multi-level index 200 of backup files, under an embodiment. The data structure 200 is depicted as a B-tree, which can be a data structure that keeps data sorted and allows searches, sequential access, insertions, and deletions. A B-tree is a generalization of a binary search tree in that a node can have more than two children. When data is inserted or removed from a node, its number of child nodes changes. For example, after the backup/restore application 120 creates the differential backup file for a database at midnight on Thursday July 19$^{th}$, the backup/restore application 120 adds this July 19$^{th}$ differential backup file to the second level 202 of the B-tree 200, as the 4$^{th}$ child node of the July 15$^{th}$ full backup file at the first level 201, which previously had 3 child nodes: the July 16$^{th}$ differential backup file, the July 17$^{th}$ differential backup file, and the July 18$^{th}$ differential backup file.

Continuing this example of the first two levels 201-202, after the backup/restore application 120 creates the full backup file for the database at midnight on Sunday July 22$^{nd}$, the backup/restore application 120 adds this July 22$^{nd}$ full backup file to the first level 201 of the B-tree 200, such that the July 15$^{th}$ full backup file has a final number of 6 child nodes at the second level 202: the July 16$^{th}$ differential backup file, the July 17$^{th}$ differential backup file, the July 18$^{th}$ differential backup file, the July 19$^{th}$ differential backup file, the July 20$^{th}$ differential backup file, and the July 21$^{st}$ differential backup file.

For an example of the second and third levels 202-203, after the backup/restore application 120 creates the incremental backup file for the database at 9::00 on Thursday July 19$^{th}$, the backup/restore application 120 adds this 9:00 incremental backup file to the third level 203 of the B-tree 200, as the 9$^{th}$ child node of the July 19$^{th}$ differential backup file on the second level 202, which previously had 8 child nodes: the 1:00 incremental backup file, the 2:00 incremental backup file, the 3:00 incremental backup file, the 4:00 incremental backup file, the 5:00 incremental backup file, the 6:00 incremental backup file, the 7:00 incremental backup file, and the 8:00 incremental backup file. Continuing this example of the second and third levels 202-203, after the backup/restore application 120 creates the differential backup file for the database at midnight on Sunday July 20$^{th}$, the backup/restore application 120 adds this July 20$^{th}$ differential backup file to the second level 202 of the B-tree 200, such that the July 19$^{th}$ differential backup file has a final number of 23 child nodes at the third level 203: the 23 incremental backup files created from 01:00 to 23:00 on July 19$^{th}$.

For an example of the third and fourth levels 203-204, after the backup/restore application 120 creates the transaction log backup file for the database at 9::30 on Thursday July 19$^{th}$, the backup/restore application 120 adds this 9:30 incremental backup file to the fourth level 204 of the B-tree 200, as the 2$^{nd}$ child node of the 9:00 incremental backup file on the third level 203, which previously had 1 child node: the 9:15 transaction log backup file. Continuing this example of the third and fourth levels 203-204, after the backup/restore application 120 creates the incremental backup file for the database at 10:00 on Sunday July 19$^{th}$, the backup/restore application 120 adds this 10:00 incremental backup file to the third level 203 of the B-tree 200, such that the 9:00 incremental backup file has a final number of 3 child nodes at the fourth level 204: the 9:15 transaction log backup file, the 9:30 transaction log backup file, and the 9:45 transaction log backup file.

For purposes of readability and space management, FIG. 2 depicts only the last of 6 child nodes on the second level 202 for the July 1$^{st}$ full backup file, which is the July 7 differential backup file, and the first of 6 child nodes on the second level 202 for the July 22$^{nd}$ full backup file, which is the July 23$^{rd}$ differential backup file. Similarly, FIG. 2 does not depict any of the incremental backup files that are the child nodes for the full or differential backup files created from July 1$^{st}$ to July 17$^{th}$ or July 21$^{st}$ to July 28$^{th}$, and depicts only the last of 23 child nodes for the July 18$^{th}$ differential backup file, which is the 23:00 incremental backup file created on July 18$^{th}$, and only the first of 23 child nodes for the July 20$^{th}$ differential backup file, which is the 01:00 incremental backup file created on July 20$^{th}$. Likewise, FIG. 2 does not depict any of the transaction backup files that are the child nodes for the incremental backup files created from July 1$^{st}$ through July 18$^{nd}$ or July 20$^{th}$ through July 28$^{th}$, and depicts only the transaction log backup files created from 8:45 to 16:45 that are the child nodes for the July 19$^{nd}$ incremental backup files created from 0:800 to 16:00.

Figure 3:
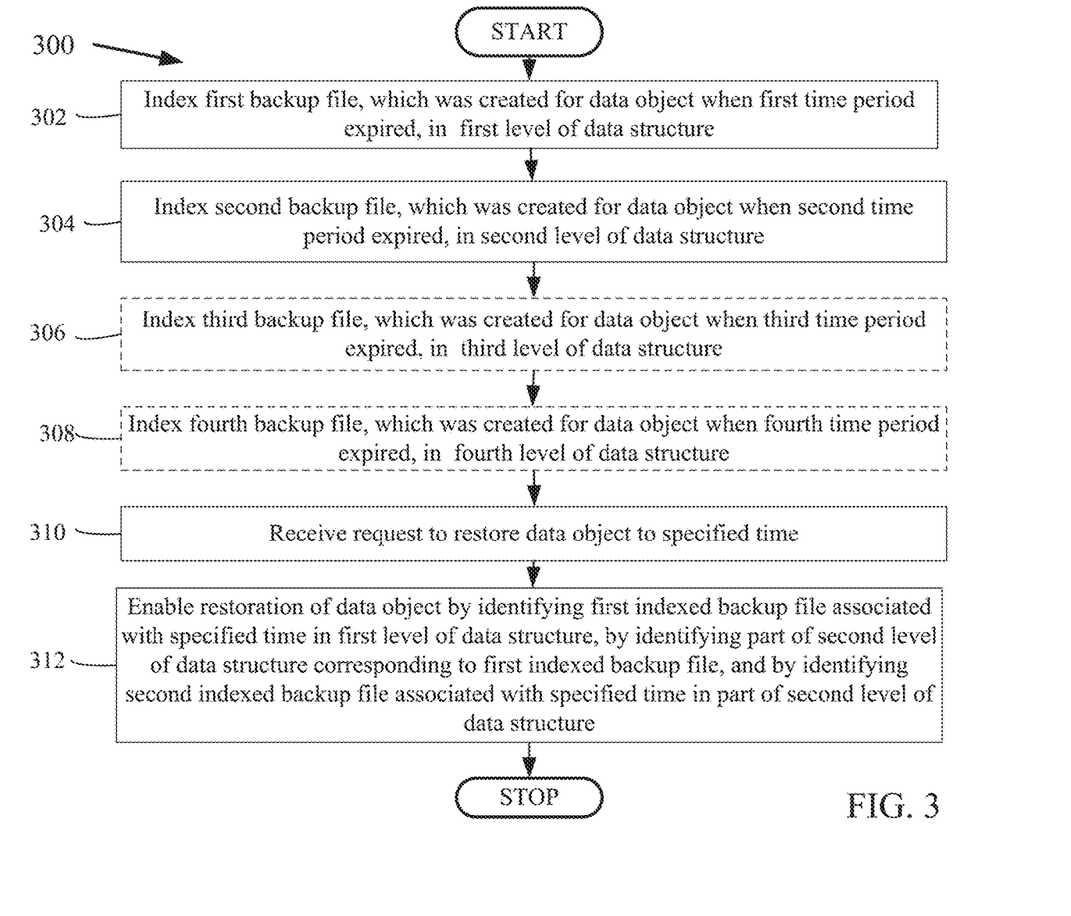
FIG. 3 is a flowchart that illustrates a method of multi-level indexing of backup files, under an embodiment.

FIG. 3 is a flowchart that illustrates a method for multi-level indexing of backup files, under an embodiment. Flowchart 300 illustrates method acts illustrated as flowchart blocks for certain steps involved in and/or between the clients 102-108 and/or the server 110 of FIG. 13 and also involving the multi-level index 200 of FIG. 2.

A first backup file, which was created for a data object when a first time period expired, is indexed in a first level of a data structure, block 302. The system can index full backup files in a B-tree's first level. For example, and without limitation, this can include the backup/restore application 120 indexing a database's full backup files, created on the first 4 Sunday midnights in July 2018, in the first level 201 of the B-tree 200.

After indexing the first backup file, a second backup file, which was created for the data object when a second time period expired, is indexed in a second level of the data structure, the second time period being shorter than the first time period that expired, block 304. The system can index differential backup files in a B-tree's second level. By way of example and without limitation, this can include the backup/restore application 120 indexing the database's differential backup files, created on the remaining midnights in July 2018, in the second level 202 of the B-tree 200.

Following the indexing of the first two backup files, a third backup file, which was created for the data object when a third time period expired, is optionally indexed in a third level of the data structure, the third time period being shorter than the second time period that expired, block 306. The system can index incremental backup files in a B-tree's third level. In embodiments, this can include the backup/restore application 120 indexing the database's incremental backup files, created every hour other than midnight, in the third level 203 of the B-tree 200.

Having indexed the first three backup files, a fourth backup file, which was created for the data object when a fourth time period expired, is optionally indexed in a fourth level of the data structure, the fourth time period being shorter than the third time period that expired, block 308. The system can index transaction log backup files in a B-tree's fourth level. For example, and without limitation, this can include the backup/restore application 120 indexing the database's transaction log backup files, created every 15 minutes between each hour, in the fourth level 204 of the B-tree 200.

After indexing the backup files for the data object, a request is received to restore the data object to a specified time, block 310. The system receives requests to restore data objects. By way of example and without limitation, this can include the backup/restore application 120 receiving a request from a database administrator to restore the database to its state on Thursday Jul. 19, 2018. In another example, the backup/restore application 120 receives a request from the database administrator to restore the database to its state on Thursday Jul. 19, 2018 at 9:15 A.M.

Responding to the restore request, restoration of the data object is enabled by identifying a first indexed backup file associated with the specified time in the first level of the data structure, by identifying a part of the second level of the data structure corresponding to the first indexed backup file, and by identifying a second indexed backup file associated with the specified time in the part of the second level of the data structure, block 312.

The system uses multi-level indexing of backup files to efficiently restore data objects. In embodiments, this can include the backup/restore application 120 searching the first level 201 of the B-tree 200 that indexes the 4 full backup files to identify the $3^{rd}$ full backup file, created on Sunday July $15^{th}$, which has child nodes in the second level of the B-tree, that are the 6 differential backup files created on Monday July $16^{th}$ to Saturday July $21^{st}$. Then the backup/restore application 120 searches these child nodes in the second level 202 of the B-tree 200 that indexes the 6 differential backup files created on Monday July $16^{th}$ to Saturday July $21^{st}$ to identify the $4^{th}$ differential backup file, created on Thursday July $19^{th}$.

In another example, since the $4^{th}$ differential backup file, created on Thursday July $19^{th}$, has child nodes in the third level 203 of the B-tree 200, which are the 23 incremental backup files created from 01:00 to 23:00 on July $19^{th}$, the backup/restore application 120 searches these child nodes in the third level 203 of the B-tree 200 to identify the $9^{th}$ of these 23 incremental backup files, which was created at 09:00 on Thursday July $19^{th}$. In yet another example, since the $9^{th}$ incremental backup file, created at 09:00 on July $19^{th}$, has child nodes in the fourth level 204 of the B-tree 200, which are the 3 transaction log backup files created from 09:15 to 09:45 on July $19^{th}$, the backup/restore application 120 searches these child nodes in the fourth level 204 of the B-tree 200 to identify the $1^{st}$ of these 3 transaction log backup files, which was created at 09:15 on Thursday July $19^{th}$. The backup/restore application 120 uses the efficiently-identified backup files to restore the database to its state on July $19^{th}$, as requested by the database administrator.

Although FIG. 3 depicts the blocks 302-312 occurring in a specific order, the blocks 302-312 may occur in another order. In other implementations, each of the blocks 302-312 may also be executed in combination with other blocks and/or some blocks may be divided into a different set of blocks.

Figure 4:
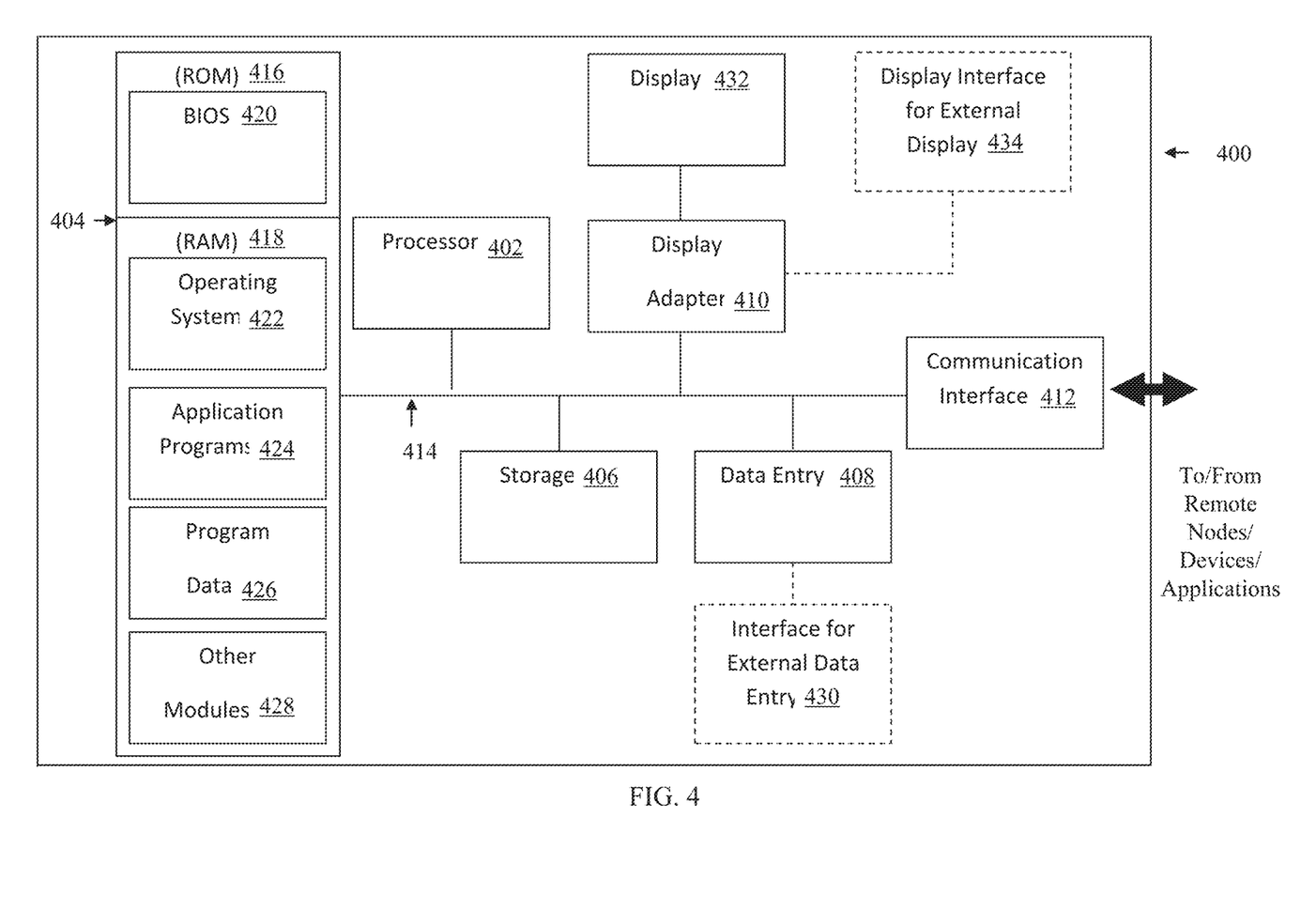
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed, cause the one or more processors to:
   index, in a first level of a hierarchical data structure, a first backup file that was created for a data object when a first time period expired;
   index, in a second level of the hierarchical data structure, a second backup file that was created for the data object when a second time period expired, the second time period being shorter than the first time period;
   receive a request to restore the data object to a specified time; and
   enable restoration of the data object by identifying: i) a first indexed backup file associated with the specified time by querying the first level of the data structure, ii) a part of the second level of the data structure corresponding to the identified first indexed backup file, and iii) a second indexed backup file associated with the specified time by querying the identified part of the second level of the data structure.

2. The system of claim 1, wherein the first level of the data structure indexes full backup files.

3. The system of claim 1, wherein the data structure comprises a B-tree.

4. The system of claim 1, wherein the second level of the data structure indexes at least one of differential backup files, incremental backup files, and transaction log backup files.

5. The system of claim 1, wherein the plurality of instructions further causes the processor to index a third backup file, which was created for the data object when a third time period expired, in a third level of the data structure, the third time period being shorter than the second time period, wherein enabling restoration of the data object further comprises identifying a part of the third level of the data structure corresponding to the second indexed backup file, and identifying a third indexed backup file associated with the specified time in the part of the third level of the data structure.

6. The system of claim 5, wherein the plurality of instructions further causes the processor to index a fourth backup file, which was created for the data object when a fourth time period expired, into a fourth level of the data structure, the fourth time period being shorter than the third time period, wherein enabling restoration of the data object further comprises identifying a part of the fourth level of the data structure corresponding to the third indexed backup file, and identifying a fourth indexed backup file associated with the specified time in the part of the fourth level of the data structure.

7. The system of claim 5, wherein the third level of the data structure indexes at least one of incremental backup files and transaction log backup files.

8. A method comprising:
   indexing, in a first level of a hierarchical data structure, a first backup file that was created for a data object when a first time period expired;
   indexing, in a second level of the hierarchical data structure, a second backup file that was created for the data object when a second time period expired, the second time period being shorter than the first time period;
   receiving a request to restore the data object to a specified time; and
   enabling restoration of the data object by identifying: i) a first indexed backup file associated with the specified time by querying the first level of the data structure, ii) a part of the second level of the data structure corresponding to the identified first indexed backup file, and iii) a second indexed backup file associated with the specified time by querying the identified part of the second level of the data structure.

9. The method of claim 8, wherein the first level of the data structure indexes full backup files.

10. The method of claim 8, wherein the data structure comprises a B-tree.

11. The method of claim 8, wherein the second level of the data structure indexes at least one of differential backup files, incremental backup files, and transaction log backup files.

12. The method of claim 8, wherein the computer-implemented method further comprises indexing a third backup file, which was created for the data object when a third time period expired, in a third level of the data structure, the third time period being shorter than the second time period, wherein enabling restoration of the data object further comprises identifying a part of the third level of the data structure corresponding to the second indexed backup file, and identifying a third indexed backup file associated with the specified time in the part of the third level of the data structure.

13. The method of claim 12, wherein the computer-implemented method further comprises indexing a fourth backup file, which was created for the data object when a fourth time period expired, into a fourth level of the data structure, the fourth time period being shorter than the third time period, wherein enabling restoration of the data object further comprises identifying a part of the fourth level of the data structure corresponding to the third indexed backup file, and identifying a fourth indexed backup file associated with the specified time in the part of the fourth level of the data structure.

14. The method of claim 12, wherein the third level of the data structure indexes at least one of incremental backup files and transaction log backup files.

15. A computer program product, comprising a non-transitory computer-readable medium having a computer-readable program code embodied therein to be executed by one or more processors, the program code including instructions to:
- index, in a first level of a hierarchical data structure, a first backup file that was created for a data object when a first time period expired;
- index, in a second level of the hierarchical data structure, a second backup file that was created for the data object when a second time period expired, the second time period being shorter than the first time period;
- receive a request to restore the data object to a specified time; and
- enable restoration of the data object by identifying: i) a first indexed backup file associated with the specified time by querying the first level of the data structure, ii) a part of the second level of the data structure corresponding to the identified first indexed backup file, and iii) a second indexed backup file associated with the specified time by querying the identified part of the second level of the data structure.

16. The computer program product of claim 15, wherein the first level of the data structure indexes full backup files.

17. The computer program product of claim 15, wherein the data structure comprises a B-tree.

18. The computer program product of claim 15, wherein the second level of the data structure indexes at least one of differential backup files, incremental backup files, and transaction log backup files.

19. The computer program product of claim 15, wherein the wherein the program code includes further instructions to index a third backup file, which was created for the data object when a third time period expired, in a third level of the data structure, the third time period being shorter than the second time period, wherein enabling restoration of the data object further comprises identifying a part of the third level of the data structure corresponding to the second indexed backup file, and identifying a third indexed backup file associated with the specified time in the part of the third level of the data structure.

20. The computer program product of claim 19, wherein the wherein the program code includes further instructions to index a fourth backup file, which was created for the data object when a fourth time period expired, into a fourth level of the data structure, the fourth time period being shorter than the third time period, wherein enabling restoration of the data object further comprises identifying a part of the fourth level of the data structure corresponding to the third indexed backup file, and identifying a fourth indexed backup file associated with the specified time in the part of the fourth level of the data structure.

* * * * *